Sept. 12, 1933. F. S. MORRIS Re. 18,942

DISH AND COVER

Original Filed Jan. 10, 1922

Inventor:
Frederick S. Morris, deceased,
by The Vollrath Co, assignee,
By Williams, Bradbury
McCaleb & Hinkle.
Attys.

Reissued Sept. 12, 1933

Re. 18,942

UNITED STATES PATENT OFFICE 18,942

DISH AND COVER

Frederick S. Morris, deceased, late of Sheboygan, Wis., by The Vollrath Co., assignee, Sheboygan, Wis., a corporation of Wisconsin Original No. 1,561,943, dated November 17, 1925, Serial No. 528,225, January 10, 1922. Application for reissue June 26, 1933. Serial No. 677,869

7 Claims. (Cl. 65—59)

This invention relates to improvements in dishes and covers, more particularly, although not solely, adapted for refrigerator use. Seamless drawn steel enameled dishes and covers of various round and oval shapes now in every day use are objectionable due to the fact that considerable space is lost when a number of dishes and their covers are placed on a shelf and more particularly refrigerator shelves in which the storage space is very limited and it is desirable in home refrigerators to accommodate a considerable number of different dishes. It is also desirable to eliminate seams and joints in dishes and covers adapted to hold food for any length of time due to the fact that it is extremely difficult to completely clean seams and joints and the food lodged therein will soon contaminate other food placed in the dish or resting on the cover.

It is one of the objects of the present invention to overcome the before mentioned objectionable features and provide a dish and cover of approximately square shape which are entirely free from joints or seams and which will permit the placing of the greatest number of dishes and their covers in a limited area to occupy a minimum amount of space.

A further object of the invention is to provide a dish of square seamless form in horizontal section and having slightly rounded corners and tapered side portions to permit nesting of a plurality of the dishes together.

A further object of the invention is to provide a dish of square formation having comparatively deep tapered side portions and outwardly and downwardly extending upper edge portions.

A further object of the invention is to provide a dish cover in square formation shaped to snugly fit its dish and permit the placing of other dishes on top of the cover, and furthermore to provide a dish cover which may also be used as a dish itself either side up.

A further object of the invention is to provide a dish and cover of square seamless formation which are of simple construction, are strong and durable and are well adapted for the purpose described.

With the above and other objects in view the invention consists of the improved dish and cover and their parts and combinations as set forth in the claims, and all equivalents thereof.

In the accompanying drawing in which the same reference characters indicate the same parts in all of the views.

Figure 1:
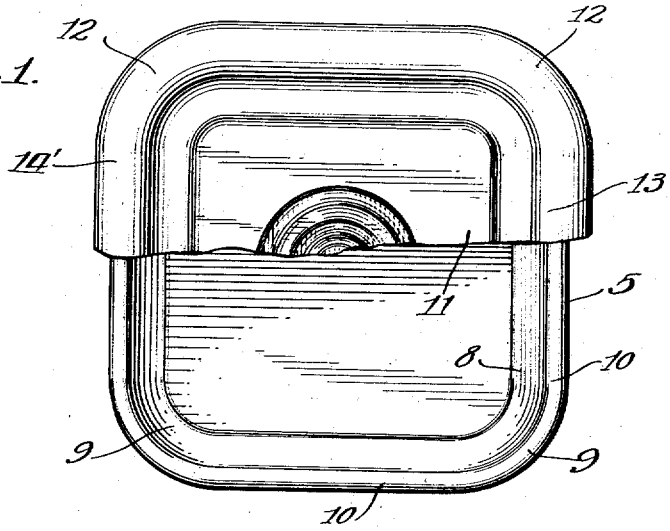
Fig. 1 is a top view of the improved dish and a portion of the cover.

Referring to the drawing, the numeral 5 indicates a dish preferably formed of sheet metal 6, covered both inside and out with an enameled coat 7, baked thereon. The dish is of approximately square or rectangular shape in horizontal section and is formed with tapered side portions 8 and slightly rounded corners 9 to permit convenient nesting of the dishes and to eliminate sharp corners in which food might lodge. The upper edge portions of the sides curve outwardly and downwardly to form flanges 10 which reinforce and give an ornate appearance to the dish. Particular attention is directed to the fact that the dish is of one piece construction and that the corner portions are entirely free from seams or joints so that smooth interior and exterior surfaces are provided thus forming a sanitary dish very desirable for holding food.

Figure 2:
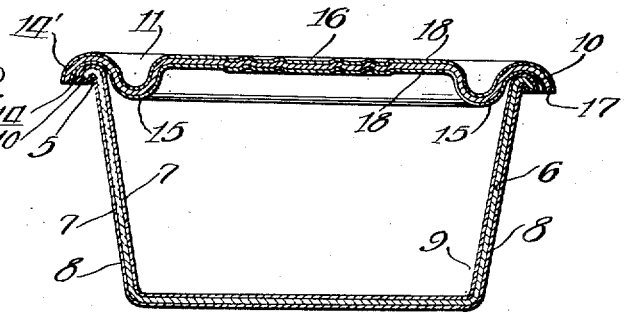
Fig. 2 is a transverse sectional view thereof.
Figure 3:
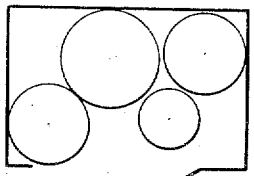
Fig. 3 is a diagrammatic top view of a refrigerator showing a number of round dishes of ordinary construction therein.
Figure 4:
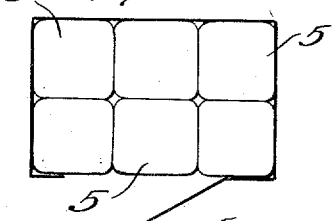
Fig. 4 is a similar view showing the greater number of the improved square dishes which may be accommodated in the space of the same size.
Figure 5:
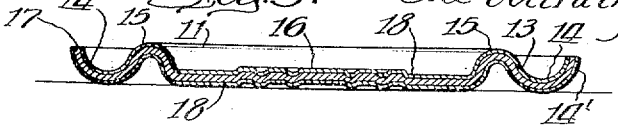
Fig. 5 is a sectional view of the cover shown in inverted position when used as a dish.

The cover 11 of the improved dish is also of rectangular shape with rounded corners 12 and is formed with edge corrugations 13 of S-shape in cross section. The outer corrugation is upwardly curved to form a rectangular groove 14 into which the upper edge of the dish extends when the cover is placed thereon, as shown in Fig. 2. The inner corrugation is curved downwardly to form a shoulder or bead 15 which extends into the dish close to the upper edge thereof and prevents said cover from accidentally sliding off the dish, and also permits nesting the covers together. The inner portion 10 of the cover is approximately of flat shape so that when in inverted position as shown in Fig. 5 the cover may be used as a plate or dish, the opposite side portion of the grooved cover part forming a supporting rib or bead 14′ for said cover. The said cover is also formed of sheet metal 17 covered on both sides with enamel 18 baked thereon.

From the foregoing description it will be seen that the invention is of very simple construction and that a given area will accommodate a greater number of dishes and their covers of the improved form and of greater capacity than the ordinary dishes and covers now in general use.

For convenient sliding or lifting of the dish and cover together, the assembly may be grasped between the fingers, for example, with the thumb resting against the side of the rib 14′ which is in common with the outer wall of the upwardly facing groove in the cover, while placing the forefinger against the exposed portion of the flange 10, preferably using the other fingers braced against the adjacent side of the dish toward its bottom.

The upwardly facing groove formed on the upper side of the shoulder 15 constitutes a peripheral trough which will collect and retain liquids which may be spilled on to the dish from other receptacles in upper shelves of a refrigerator. In this way such spilled liquids do not enter the dish to contaminate the contents thereof, nor is it left to trickle over the edge of the cover on to other receptacles beneath the dish or onto the shelves or bottom wall of the refrigerator.

When the cover is used in the inverted position of Fig. 5 the shoulder 15 constitutes a lower barrier between the field of the cover and the rim receiving groove 14. This barrier prevents liquid or other small particles from getting into the groove 14. This feature is of especial advantage when the dish and cover are used in inverted position for the storage of meats, for the barrier holds the juices of the meat out of the rim receiving groove 14 and still the shoulder 14 and the outermost flange of the groove 14 are sufficiently low to permit ready slicing of the meat on the inverted cover when the dish is lifted off.

When the pan is off the inverted cover, the outer groove forms a clean isolated finger hold groove free from juices, gravy and particles of the food carried on the inverted cover, which makes the cover particularly advantageous for use as a tray after the removal of the dish which has been used to enclose the contents of the inverted cover for storage. While the pan is in place on the inverted cover, the spacing of the outermost flange of the cover from the side wall of the dish also affords a convenient finger hold for carrying the assembled unit.

What is claimed is:

1. A sheet metal dish and cover of rectangular form in horizontal section and having seamless corner portions being non-folded and formed of single thicknesses of metal, the cover having a rectangular groove on one side to receive the upper edge portions of the dish and being invertible for use on either side.

2. A sheet metal dish and invertible cover of rectangular form in horizontal section and having seamless corner portions formed of single thicknesses of metal, the cover having a rectangular groove on one side to receive the upper edge portions of the dish and a rib on the other side to support the cover when in inverted position, said groove and rib being formed by reverse curves in the metal.

3. A sheet metal dish of rectangular form in horizontal section comprising a bottom and side and end walls and having seamless corner portions being non-folded and formed of single thicknesses of metal, and having continuously about its upper edge an outwardly and then downwardly turned rim, and a cover for the dish formed of single thickness sheet metal having an inner and an outer continuous peripheral groove, rectangular in plan with their longitudinal and transverse axes respectively coincident, the outer groove including a downwardly extending outermost flange and opening downwardly on the underside of the cover for non-frictionally and loosely receiving the rim of the dish to position the cover on the dish with the flange substantially embracing the rim, the outer groove forming, on the upper side of the cover, a corresponding outer bead, the inner groove opening upwardly on the upper side of the cover and forming a liquid-retaining trough for liquids spilled on to the upper side of the cover, the inner groove constituting a corresponding inner bead on the underside of the cover, the inner and outer groove portions being substantially S-shaped in cross section whereby they have their intermediate lateral wall in common, the field of the cover within the inner groove extending intermediate the planes of the uppermost surface of the outer bead and the lowermost surface of the inner bead, said rim and said common wall affording, while the cover is resting on the rim, opposed finger engaging portions whereby the dish and cover may be grasped between fingers for lifting the dish and cover together, the cover, when the cover and dish are inverted upon a flat table surface, resting substantially without rocking and in part at least on said outer bead, the inner bead at such time constituting a shallow barrier between the field of the cover and the rim receiving outer groove.

4. A sheet metal dish and cover of rectangular form in horizontal section and having seamless corner portions being non-folded and formed of single thicknesses of metal, the dish also having an outwardly turned rim about its upper edge, and a rectangular cover having its margins formed into S-shaped cross section to provide an upwardly opening inner, and a downwardly opening outer, continuous peripheral groove, the outer groove loosely receiving the rim to position the cover on the dish, the field of the cover within the grooves being substantially flat and above the plane of the valley of the inner groove whereby the cover may be used in inverted position with the reverse side of the inner groove forming a low barrier between the field and the rim-receiving outer groove.

5. A sheet metal dish and cover of rectangular form and horizontal section and having seamless corner portions being non-folded and formed of single thicknesses of metal, the dish also having an outer and downwardly turned rim about its upper edge, and a rectangular cover having its margins formed into S-shaped cross section to provide a downwardly opening outer groove with its outer wall terminating in a down turned flange and adapted loosely to receive the rim with the lower edges of the rim and flange substantially co-planar whereby the margin of the cover and the flange may be grasped between fingers for lifting the dish and cover together, and to provide also an upwardly opening inner groove, the cover being invertible for use on either side.

6. A sheet metal dish and cover of rectangular form in horizontal section and having seamless corner portions non-folded and formed of single thicknesses of metal, the dish also having an outwardly turned rim about its upper edge, and a substantially flat bottom, and a rectangular cover having its margins formed into S-shaped cross section to provide an upwardly opening inner, and a downwardly opening outer, peripheral groove, the outer groove loosely receiving the rim with the outermost wall of the outer groove down turned and spaced outwardly from the planes of the side wall of the pan, the upper aspect of the field of the cover inwardly of the grooves being constructed and arranged for the reception of the bottom of a similar pan, whereby the dish and cover, either obverted or inverted, may be stacked directly with, either above or below, a similar dish and cover, the nether aspect of the field of the cover when inverted being constructed and arranged for the reception in sliding accessibility and storage of solid foods, such as meats, with the reverse side of the inner groove constituting a peripherally continuous low liquid retaining barrier between the field and the rim-receiving outer groove, the field of the cover lying substantially within the uppermost and lowermost planes of the cover, when the dish and cover are inverted the outermost flange of the cover, by its spacing away from the side wall of the pan, affording a finger hold, the cover being constructed and arranged to internest with like covers.

7. A sheet metal dish and cover of rectangular form in horizontal section and having seamless corner portions non-folded and formed of single thicknesses of metal, the dish also having an outwardly turned rim about its upper edge, and a substantially flat bottom, and a rectangular cover having its margins formed into S-shaped cross section to provide an upwardly opening inner, and a downwardly opening outer, peripheral groove, the outer groove loosely receiving the rim with the outermost wall of the outer groove down turned and spaced outwardly from the planes of the side wall of the pan, the upper aspect of the field of the cover inwardly of the grooves being constructed and arranged for the reception of the bottom of a similar pan, whereby the dish and cover, either obverted or inverted, may be stacked directly with, either above or below, a similar dish and cover, the field of the cover inwardly of the grooves lying substantially between the uppermost and lowermost planes of the cover with the reverse side of the inner groove constituting a low barrier for the cover when inverted separating the field from the outer groove whereby food on the field is deterred from entering the groove, the groove, when the cover is inverted and the pan removed, forming a finger hold and when the pan is on the inverted cover the outermost flange of the cover, being spaced away from the side walls of the pan, presenting a finger hold.

THE VOLLRATH CO.,
*Assignee of Frederick S. Morris (Deceased),*
By JEAN C. VOLLRATH,
*President.*